INVENTORS
ROBERT Y. WONG
WILLIAM J. NUSBAUM
DONALD E. HOLESKI

ATTORNEYS

INVENTORS
ROBERT Y. WONG
WILLIAM J. NUSBAUM
DONALD E. HOLESKI
BY
ATTORNEYS

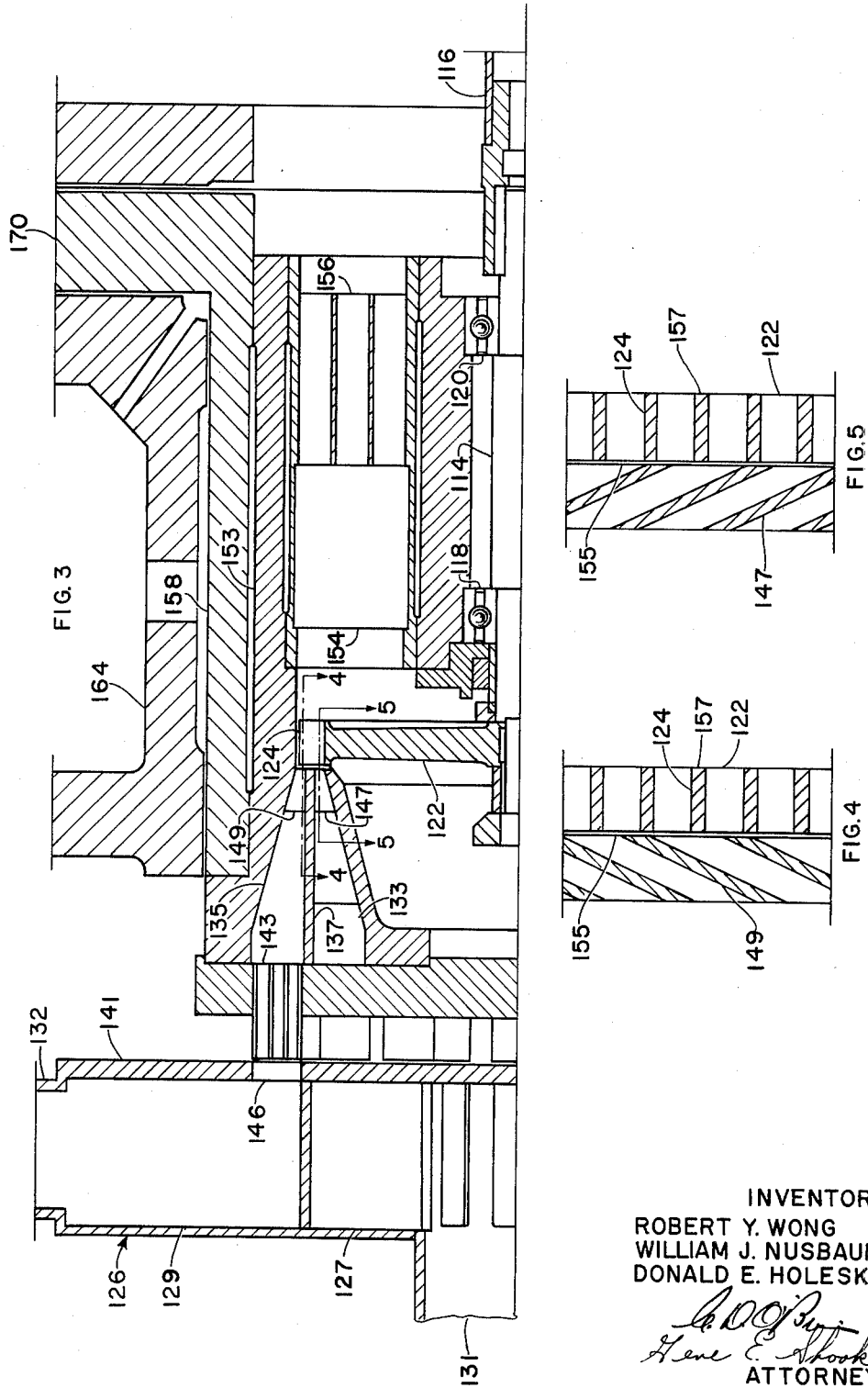

3,221,547
APPARATUS FOR ABSORBING AND
MEASURING POWER
Robert Y. Wong, William J. Nusbaum, and Donald E. Holeski, Cleveland, Ohio, assignors to the United States of America as represented by the Administrator of the National Aeronautics and Space Administration
Filed Aug. 16, 1963, Ser. No. 302,749
8 Claims. (Cl. 73—134)
(Granted under Title 35, U.S. Code (1952), sec. 266)

The invention described herein may be manufactured and used by or for the Government of the United States of America for governmental purposes without the payment of any royalties thereon or therefor.

This invention relates to the absorption and accurate measurement of power from a rotating shaft. The invention is further concerned with providing a measured power input to a rotatable shaft for ascertaining the amount of power dissipated in the bearings and seals around such a shaft.

Various power absorbing devices have been proposed such as the conventional air brake or absorption dynamometer in which the power is dissipated through the rotation of a fan or air-screw. This type of apparatus merely absorbs the power by transferring the kinetic energy of the wheel to the braking fluid and does not provide for its accurate measurement. Because kinetic energy is imparted to the fluid by the wheel the capability of such an air brake to absorb torque at near zero wheel speed is negligible.

The reverse turbine air brake of the present invention supplies the deficiencies of conventional power absorption devices. This air brake uses a stator which imparts a tangential momentum to the braking fluid before it enters the rotor vanes in a direction opposite to the rotation of the rotor. The rotor removes this tangential momentum and thereby absorbs power. Because the stator imparts tangential momentum to the braking fluid before it contacts the rotor vanes this apparatus is capable of absorbing torque at near zero speed.

It is, therefore, an object of the present invention to provide apparatus for measuring power being delivered at almost no rotation to the maximum rotation of a drive shaft and for absorbing torque at no rotation or low speeds.

Another object of the invention is to provide an improved air brake that is compact in size and is capable of measuring starting torque.

Other objects and advantages of the invention will be apparent from the specification which follows and from the drawings wherein like numerals are used throughout to identify like parts.

In the drawings:

FIG. 3 is an enlarged sectional view taken along the line 3—3 in FIG. 2.

FIG. 4 is an enlarged sectional view taken along the line 4—4 in FIG. 3.

FIG. 5 is an enlarged sectional view taken along the line 5—5 in FIG. 3.

Figure 1:
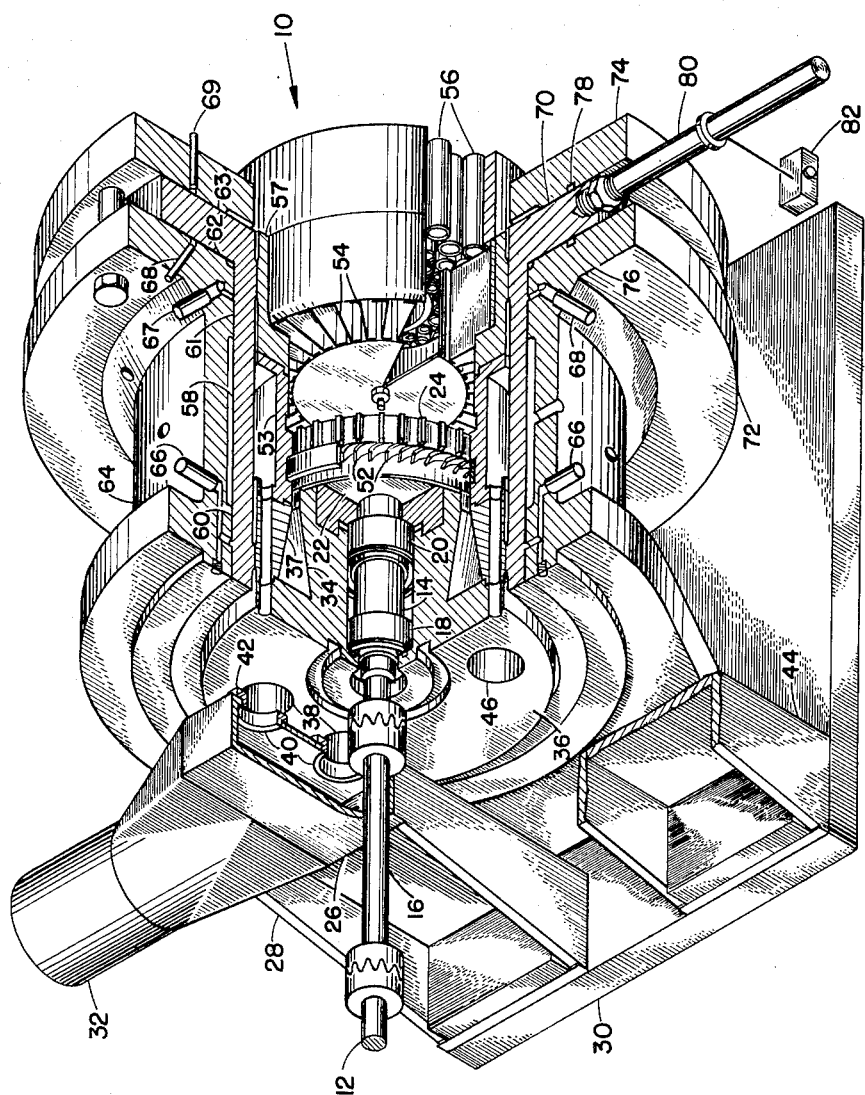
FIG. 1 is a sectional view of a reverse turbine air brake constructed in accordance with the invention.

Referring now to FIG. 1 of the drawings, there is shown a reverse turbine air brake 10 constructed in accordance with the invention for absorbing and accurately measuring torque from a shaft 12 which extends from a prime mover, such as a turbine or motor (not shown). The reverse turbine air brake 10 includes a shaft 14 which is aligned with the shaft 12, and these shafts are operably connected by a torque transmitting misalignment coupling 16. The shaft 14 extends through a pair of spaced bearings 18 and 20 which enables the aligned shafts 12 and 14 to rotate together with the torque from the prime mover being transmitted to the brake 10 through the coupling 16. A rotor 22 is rigidly mounted on the end of the shaft 14 opposite the coupling 16 for rotation with the shafts 12 and 14, and a plurality of rotor blades 24 which form axial vanes are mounted around the periphery of the rotor 22.

An air inlet manifold 26 adjacent the coupling 16 is mounted on a rigid support 28 carried by a base plate 30, and a duct 32 extending normal to the shafts 12 and 14 connects the manifold 26 to a supply of braking fluid such as compressed air. The braking fluid is discharged from the manifold 26 along a patch parallel to the axis of the aligned shafts 12 and 14 into an inlet collector 34 formed by the space between a housing 36 which encloses the bearings 18 and 20 and a fairing 37. The braking fluid enters the inlet collector 34 through a pair of openings 38 which are aligned with mating openings 40 in the manifold 26, and a bushing 42 mounted in the opening 40 conducts the fluid from the manifold 26.

A similar manifold (not shown) is positioned on the opposite side of the coupling 16 and is mounted on a rigid support 44 on the base plate 30. This manifold is likewise connected to a supply of compressed air, and this braking fluid enters the inlet collector 34 through a pair of openings 46 in the end of the housing 36.

The inlet collector 34 directs the braking fluid along a path generally parallel to the axis of the rotation of the shaft 14 toward a plurality of curved stator blades 52 located between the inlet collector 34 and the rotor blades 24. During passage through the stator blades 52 the braking fluid is accelerated and given a tangential momentum in the direction opposite to the direction of rotation of the rotor 22. The braking fluid then passes from the stator blades 52 across the rotor blades 24 whereupon the rotor 22 removes the tangential momentum from the braking fluid which results in the absorption of power from the shaft 14 supplied by the shaft 12. Fluid movement across the rotor blades 24 is in the axial direction from an inlet edge adjacent the stator blades 52 to an outlet edge located downstream, and radial movement of the fluid is prevented by a tubular housing 53 which extends downstream from the fairing 37. Suitable spacing is provided between the tubular housing 53 and the rotor blades 24 to enable the rotor 22 to revolve with the shaft 14.

After discharge from the rotor blades 24 the braking fluid passes through a straightening system comprising axial vanes 54 and tubular vanes 56 whereupon the braking fluid is exhausted from the brake 10 in the axial direction at the end opposite the manifold 26. Both the axial vanes 54 and the tubular vanes 56 are rigidly secured to an extension 57 of the tubular housing 53. A casing 58 surrounds the housing 36, the fairing 37, the tubular housing 53, and the extension 57 and supports these structural components in their proper location relative to each other. Inasmuch as the braking fluid enters the collector 34 and leaves the vanes 56 within the casing 58 in an axial direction, the torque on the rotor 22 is equal to the torque on the casing 58.

The casing 58 is supported on air bearings 60, 61, 62 and 63 in a support housing 64 rigidly mounted on the base plate 30. These air bearings are connected to a suitable supply of compressed air by conduits 66, 67, 68 and 69 respectively. The air bearings 60, 61, 62 and 63 are designed to take thrust in all directions and offer very little frictional resistance to the rotation of the casing 58. More particularly, radial thrust is accommodated by the bearing area between the axially extending portions of the casing 58 and the housing 64. Likewise axial thrust toward the shaft 12 is accommodated by the bearing areas between a radially extending flange 70 on the casing 58 and a mating flange 72 on the housing 64. Axial thrust in the opposite direction away from the shaft 12 is accommodated by the bearing area between the flange 70 and a ring 74 bolted to the flange 72. Suitable recesses 76 and 78 are provided to distribute the air around the bearings 62 and 63.

A torque arm 80 is rigidly secured to the flange 70, and a load cell 82 is connected to this torque arm. The torque on the rotor 22 is measured by the load cell 82, and the power in the rotating shaft 12 can be computed from the torque in the conventional manner.

By throttling the braking fluid into the brake 10, the power absorption capabilities of the brake 10 can be varied over a wide range. Likewise, the speed of rotation of the shafts 12 and 14 can be varied over a wide range. The brake 10 is also capable of delivering power to the shaft 12 when the direction of rotation of the rotor 22 is in the same direction as the fluid flow leaving the stator blades 52.

Referring now to FIGS. 2 to 5 there is shown an alternate embodiment of the present invention which is similar to the reverse turbine air brake 10 shown in FIG. 1 with the added feature that the stator blade portion is constructed in such a manner as to provide two sets of blades which discharge braking fluid in opposite tangential directions. Each set of stator blades has a separate inlet manifold and inlet collector to provide the capability of operating the rotor in either direction and using the apparatus as an absorption dynamometer or as a drive motor merely by the proper choice of the air passed to the stators.

This alternate embodiment comprises a reverse turbine air brake 110 which is utilized for accurately measuring torque from a shaft 112 which extends from a prime mover (not shown). This reverse turbine air brake includes a centrally disposed shaft 114 which is aligned with shaft 112 and operably connected thereto by a torque transmitting misalignment coupling 116 shown in FIG. 3. A pair of spaced bearings 118 and 120 support the shaft 114, and the aligned shafts 112 and 114 rotate together with the torque from the prime mover being transmitted to the reverse turbine air brake 110 in the manner previously described in conjunction with the first embodiment.

A rotor 122 is rigidly mounted adjacent the end of the shaft 114 opposite the shaft 112 for rotation with these shafts, and a plurality of rotor blades 124 in the form of axial vanes mounted around the periphery of the rotor 122.

Figure 2:
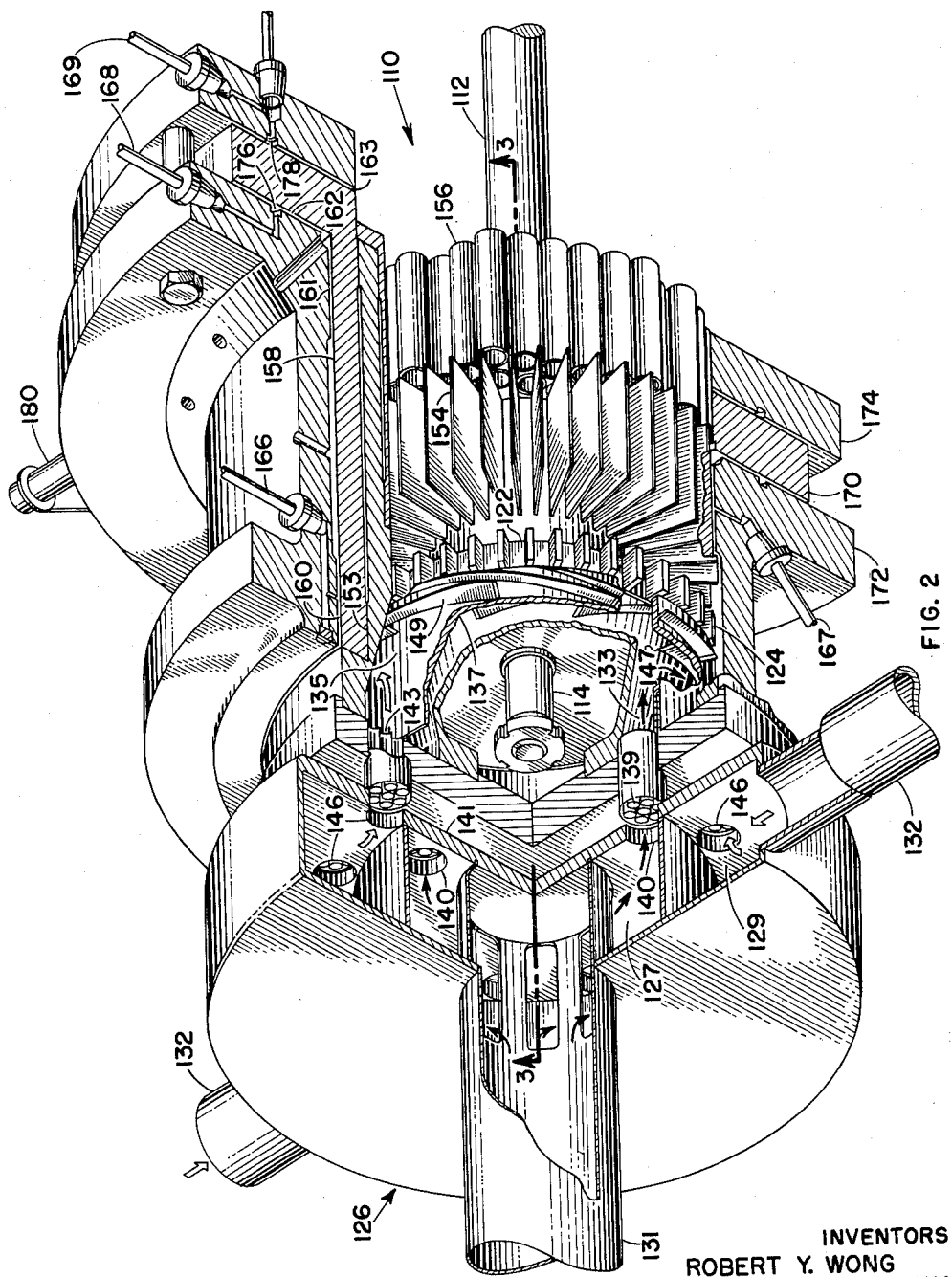
FIG. 2 is a sectional view of an alternate embodiment of a reverse turbine air brake constructed in accordance with the invention.

An inlet manifold 126 is located adjacent the end of the shaft 114 on the opposite side of the rotor 122 from the shaft 112 as shown in FIGS. 2 and 3, and a suitable support (not shown) rigidly mounts this manifold. A pair of concentric chambers 127 and 129 are formed in the manifold 126 as shown in FIGS. 2 and 3. An axially extending duct 131 conveys braking fluid from a suitable supply (not shown) to the inner chamber 127 through suitable slots while radially extending ducts 132 likewise supply the braking fluid to the outer chamber 129.

The braking fluid is directed from the manifold 126 along a path parallel to the axis of the aligned shafts 112 and 114 into an inlet collector comprising a pair of concentric chambers 133 and 135 separated by a wall 137. The braking fluid enters the inner collector chamber 133 through an assembly of straightening tubes 139 that are aligned with openings 140 in the end wall 141 of the inlet manifold 126 which faces towards the end of the shaft 114. Likewise, the braking fluid enters the outer collector chamber 135 through an assembly of straightening tubes 143 that are aligned with mating openings 146 in the end wall 141.

The inner collector chamber 133 directs the brake fluid along a path generally parallel to the axis of the rotation of the shaft 114 toward a plurality of stator blades 147 as shown in FIGS. 2, 3 and 5 located between the chamber 133 and the rotor blades 124. During passage through the stator blades 147, the braking fluid is accelerated and given a tangential momentum relative to the direction of rotation of the rotor 122. Likewise, the outer collector chamber 135 directs the braking fluid along a similar parallel path toward a plurality of stator blades 149 that extend in the opposite direction as shown in FIGS. 2, 3 and 4. The braking fluid is likewise accelerated and given a tangential momentum by the stator blades 149 in a direction opposite that given the fluid as it passes through the stator blades 147. As the air passes from the stator blades 147 or 149 through the rotor blades 124, the rotor 122 removes this tangential momentum thereby absorbing power. The passage of the braking fluid across the rotor blades 124 is restricted to axial movement by a tubular housing 153, and as the fluid leaves the stator blades 147 or 149 it passes across the rotor blades from an inlet edge 155 adjacent the stator blades to an opposed outlet edge 157 as illustrated in FIGS. 4 and 5.

After discharge from the rotor blades 124 the fluid passes through a straightening system comprising axial vanes 154 and tubular vanes 156 whereupon it is exhausted from the brake 110 in an axial direction. The torque on the rotor 122 is equal to the torque on a casing 158 which supports the housing 153 as well as the vanes 154 and 156. Suitable air bearings 160, 161, 162 and 163 which take thrust in all directions are utilized to mount the casing 158 in a support housing 164, and compressed air is supplied to these bearings through conduits 166, 167, 168 and 169.

A flange 170 on the casing 158 is positioned between a housing flange 172 and a ring 174 having recesses 176 and 178 formed therein for conducting the braking fluid to the bearings 162 and 163. A torque arm 180 extending from the flange 170 is connected to a load cell to measure the amount of torque on the rotor 122 for computing power. Here again by throttling the air into brake 110 the power absorption capabilities of the apparatus can be varied over a wide range.

In addition to the two embodiments shown, various structural modifications may be made without departing from the spirit of the invention or the scope of the subjoined claims. For example, the rotor vanes 24 and 124 may be aerodynamically curved while several rotors 22 and 122 may be used for staging. Also a stator assembly may be utilized in the embodiment shown in FIGS. 2 through 5 wherein the two stator blades angle in the same direction to increase the power absorption capabilities.

In the claims:
1. Apparatus for absorbing and accurately measuring power from a power generating device, said apparatus comprising
    a rotatably mounted shaft operably connected to said power generating device,
    a rotor mounted on said shaft for rotation therewith,
    a plurality of vanes mounted on said rotor,
    a manifold rigidly mounted adjacent one end of said shaft,
    means for supplying a braking fluid to said manifold,
    a plurality of stator blades mounted between said manifold and said rotor vanes,
    means for conveying said braking fluid from said manifold to said stator blades along a path substantially parallel to the axis of rotation of said shaft, said stator blades being angularly disposed to said path to direct said braking fluid from said path toward said rotor vanes in a direction opposite the direction of rotation of said rotor,
    a housing for mounting said stator blades adjacent said rotor vanes, said housing being in close proximity to said rotor vanes for preventing radial movement of said braking fluid during axial movement across said rotor vanes, a plurality of straightening vanes secured to said housing and positioned on the opposite side of said rotor from said stator blades for directing said braking fluid away from said vanes along a path substantially parallel to said axis of rotation of said shaft, a casing surrounding said housing and secured thereto, said casing having a first axially extending portion and a first radially extending portion, a support housing surrounding said casing, said support housing having a second axially extending portion adjacent said first axially extending portion on said casing and a second radially extending portion adjacent said first radially extending portion of said casing, first air bearings between said first and said second axially extending portions for accommodating radial thrust, second air bearings between said first and said second radially extending portions for accommodating axial thrust, and torque measuring means operably connected to said casing.

2. Apparatus for absorbing and accurately measuring power from a power generating device as claimed in claim 1, including bearings between said rotor and said manifold for mounting said shaft for rotation, a housing for mounting said bearings, and wherein said means for conveying includes an inlet collector surrounding said bearing housing in communication with said manifold and said stator blades for directing said braking fluid along said path substantially parallel to said axis of rotation.

3. Apparatus for absorbing and accurately measuring power from a power generating device as claimed in claim 1, including a base plate, means for rigidly mounting said manifold on said base plate, and means for rigidly mounting said support housing on said base plate.

4. Apparatus for absorbing and accurately measuring power from a power generating device as claimed in claim 1, including a pair of concentric chambers within said manifold, and wherein said plurality of stator blades includes first stator blades in communication with one of said chambers, said first stator blades being angularly disposed in one direction, and second stator blades in communication with the other of said chambers, said second stator blades being angularly disposed in another direction opposite said one direction.

5. Apparatus for absorbing and accurately measuring power from a power generating device as claimed in claim 4, wherein said means for conveying includes a pair of concentric collector chambers for conveying braking fluid from said manifold chambers to said first and second stator blades.

6. Apparatus for absorbing and accurately measuring power from a power generating device as claimed in claim 1, wherein said plurality of straightening vanes includes a plurality of axial straightening vanes adjacent said rotor, and a plurality of tubular straightening vanes adjacent said axial vanes.

7. Apparatus for absorbing and accurately measuring power from a power generating device having a drive shaft, said apparatus comprising a shaft in substantial alignment with said drive shaft, means for coupling said shaft to said drive shaft, means for mounting said shaft for rotation with said drive shaft, a rotor mounted on the end of said shaft opposite said coupling means, a plurality of blades mounted on the periphery of said rotor forming axial vanes, said vanes having an inlet edge adjacent one face of said rotor and an outlet edge adjacent the opposite face of said rotor, a rigidly mounted manifold spaced from said rotor, means for supplying a braking fluid to said manifold, at least one chamber extending axially from said manifold toward said rotor, a plurality of straightening vanes for placing said chamber in communication with said manifold, a plurality of stator blades located at the opposite end of said chamber from said manifold, said chamber being operable to direct said braking fluid toward said stator blades along a path substantially parallel to the axis of said shaft, said stator blades being operable to impart a tangential momentum to said braking fluid relative to said rotor vanes prior to contact therewith, a plurality of straightening vanes positioned on the opposite side of said rotor from said stator blades for directing said braking fluid along a path substantially parallel to the longitudinal axis of said shaft, a casing for rigidly mounting said straightening vanes and said stator blades, a support housing for enclosing said casing, at least one air bearing for mounting said casing within said support housing, a torque arm extending outwardly from said casing and rigidly mounted thereon, and means for measuring the force on said torque arm.

8. Apparatus for absorbing and accurately measuring power from a power generating device, said apparatus comprising a rotatably mounted shaft operably connected to the power generating device, a plurality of vanes operably connected to said shaft for rotation therewith, a plurality of stator blades adjacent said vanes, means for conveying a braking fluid to said stator blades along a path substantially parallel to the axis of rotation of said shaft, said stator blades being angularly disposed to said path to direct said braking fluid from said path toward said vanes in a direction opposite the direction of rotation of said shaft, a housing for mounting said stator blades and for preventing radial movement of said braking fluid during axial movement across said vanes, bearing means for accommodating radial and axial thrust of said housing when said braking fluid is directed from said path toward said vanes, and means operably connected to said housing for measuring the force thereon as said braking fluid is directed from said path toward said vanes.

References Cited by the Examiner

UNITED STATES PATENTS

| | | | |
|---|---|---|---|
| 2,014,684 | 9/1935 | Junkers | 73—134 |
| 2,689,476 | 9/1954 | Van Ornum | 73—134 |
| 2,923,177 | 2/1960 | Winchester | 188—90 X |
| 3,056,292 | 10/1962 | Levins | 73—194 |

RICHARD C. QUEISSER, *Primary Examiner.*